Figure 3:
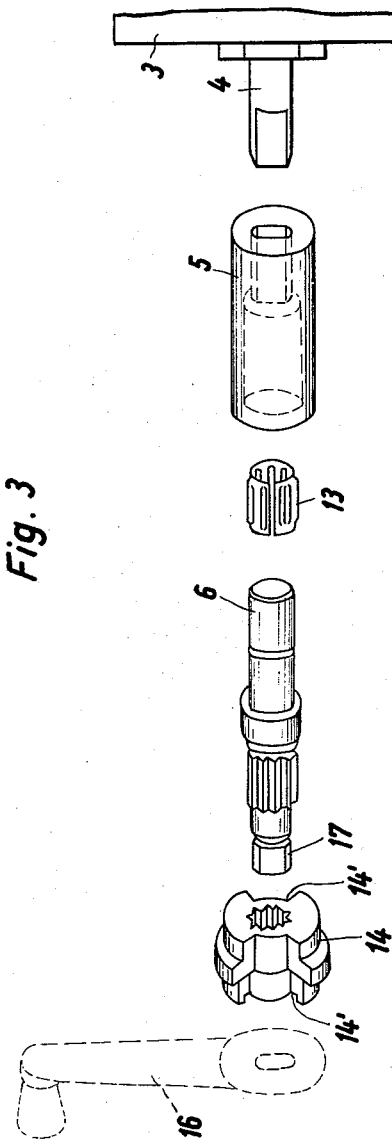

Aug. 31, 1965          J. WERNER                3,203,690
     OPERATING DEVICE COMPRISING FRICTION CLUTCH MEANS, FOR
                SLIDING WINDOWS OF MOTOR VEHICLES
Filed Aug. 5, 1963                          3 Sheets-Sheet 1
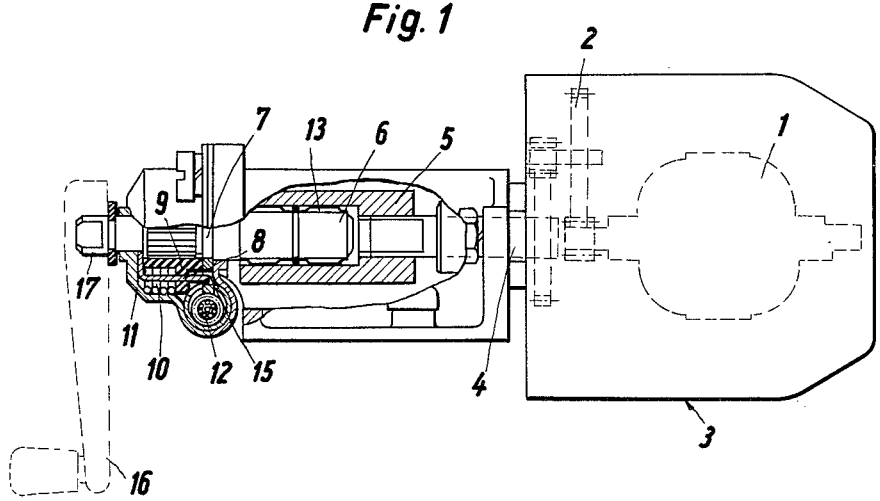
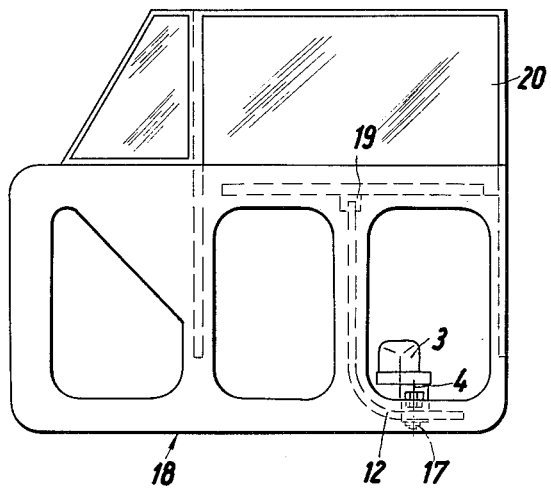

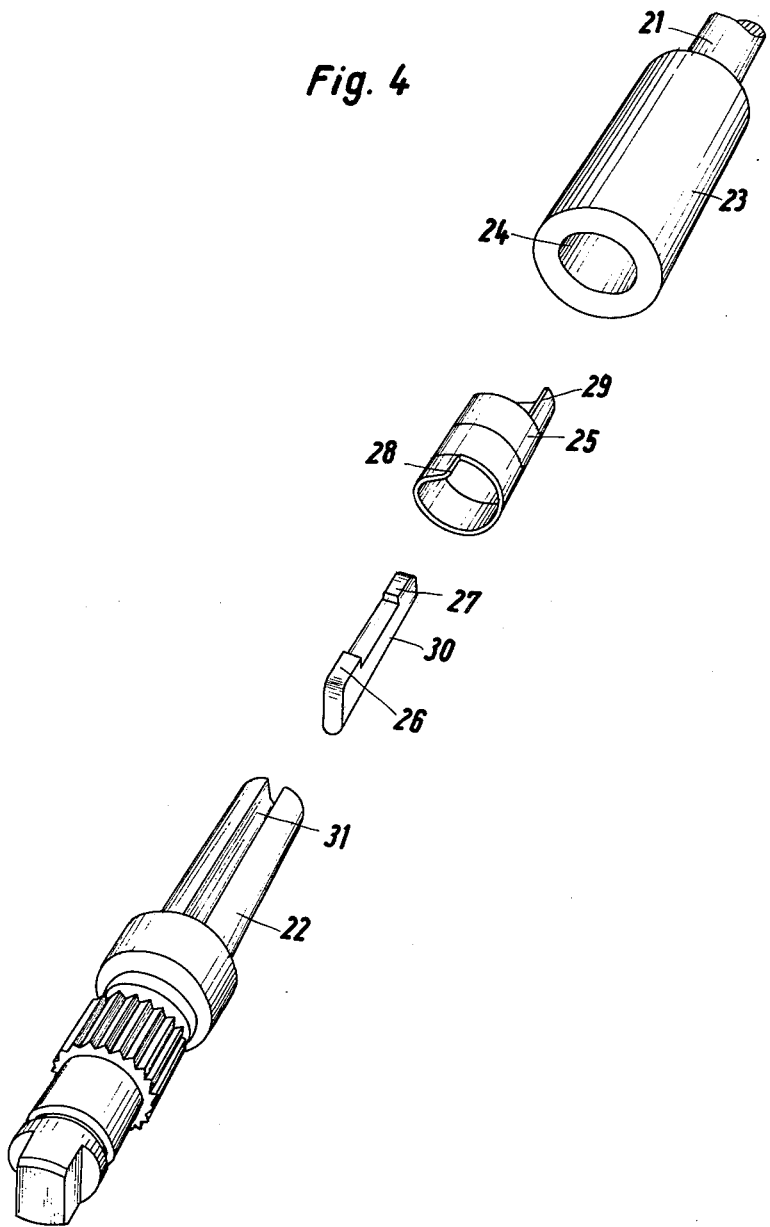

United States Patent Office 3,203,690
Patented Aug. 31, 1965

3,203,690
OPERATING DEVICE COMPRISING FRICTION CLUTCH MEANS, FOR SLIDING WINDOWS OF MOTOR VEHICLES
Johannes Werner, Offenbach, Main, Germany, assignor to H. T. Golde G.m.b.H. & Co. K.G., Frankfurt am Main, Germany
Filed Aug. 5, 1963, Ser. No. 299,979
Claims priority, application Germany, Aug. 10, 1962, G 35,691; Nov. 20, 1962, G 36,450
4 Claims. (Cl. 268—124)

This invention relates to a driving device for sliding windows of motor vehicles comprising an electric motor for axially moving a cable which can be pulled or pushed through the intermediary of a rotatably mounted driving wheel, for example a toothed wheel and which is connected to the window at at least one point.

In known drives with an electric motor a separate reduction gear was introduced between the driving shaft of the motor and the driving wheel in order to adapt the speed of the motor to the desired speed for shifting the window. Apart from the fact this arrangement required considerable time for fitting, it also required greater space for its accommodation and meant increased expense.

The object of the invention is to improve an electric driving mechanism for sliding windows and to avoid the objections mentioned above, so as to produce a cheap, compact aggregate for which preferably standard parts already on the market can be used.

This object is attained according to the invention by using as driving mechanism a prefabricated motor and reduction gear aggregate, for example of the type used for windshield wipers, wherein the driving shaft is connected with the driving wheel for the cable by a friction clutch transmitting limited torque.

According to a preferred embodiment of the invention the friction clutch may consist of a known per se clutch sleeve rigidly connected with the driving shaft and at least one sheet-metal sleeve inserted therein and provided with elastic ribs which accommodates the shaft of the driving wheel for the window cable (hereinafter referred to as the "window shaft").

According to a further embodiment of the invention, the driving wheel sits loosely on the window shaft and is provided with recesses in which the arms of a preferably U-shaped fork engage, which arms also engage in axially parallel recesses in a spacer rigidly mounted on the window shaft. Between the spacer and a substantially cylindrical housing a known entrainment spring brake is arranged in such a way that on the reversal of the motor the pinion can be yieldably carried along thereby in the actual direction of rotation.

It is also advisable to provide an extension for receiving a hand crank on the free end of the window-shaft remote from the friction clutch to enable the window to be operated by hand in the event of failure of the electric drive.

The invention also relates to an advantageous construction of a friction clutch which is particularly suitable for an electric driving mechanism for sliding windows, but might, if desired, also be used for other purposes.

By the invention, therefore, a very simple and reliably operating friction clutch is produced for transmitting a limited torque between two shaft ends, which requires only a minimum amount of material and practically no additional space. Such a friction clutch according to the invention is characterized in that the clutch has a spring which bears under tension against a cylindrical surface on one of the two shaft ends to be coupled and that on the other shaft end at least one abutment is arranged so that, in the event of relative rotational movement between the two shaft ends it will come into engagement with an abutment surface on the spring in the sense causing an increase of the pretension of the spring and entrains the shaft end through the intermediary of this spring as long as the effective torque does not exceed the frictional force acting between the spring and the cylindrical surface.

The spring may be arranged to bear under pretension either against the outer surface or against the inner surface of a shaft end, which in the latter case will be hollow, whereby the other shaft end complementary to this end carrying the spring is constructed either as a sleeve which surrounds the end carrying the spring or as a journal or pin which engages in the hollow space in the shaft against the wall of which the spring bears. The spring then engages with suitably shaped abutments on the other shaft end coordinated to the spring in such a manner that the pretension of the spring is increased when the drive is operated. The rotary movement is then transmitted indirectly through the intermediary of the spring to the other shaft end as long as the torque is maintained within predetermined limits, whereas when these limits are exceeded the initial tension of the spring will be overcome and a relative movement will take place between the spring and the shaft surface against which the spring bears under pretension.

In its simplest form the spring may consist of a split ring. However, it might also be in the form of a helical spring or the like. The friction between the spring and the shaft end coordinated thereto can always be varied within wide limits by the choice of the cross-section of the spring and consequently the friction surface between the spring and the shaft.

The engagement of the two shafts is established by abutments with which one shaft end engages the spring coordinated to the other shaft end. These abutments can be formed directly on the shaft end in question. But a form of construction is particularly practical and easy to produce in which a part carrying the abutments is positively rotatably connected with the particular shaft end, for example by a wedge-shaped insertion with radial projections for this shaft end.

While an abutment with an associated abutment surface on the spring is always sufficient for transmitting rotary movements in one direction, the clutch can be constructed for rotation in both directions in a simple manner by providing two abutments which are coordinated to two abutment surfaces arranged and acting in opposite directions on the spring.

Radially limited ends of the spring itself or angular bends or projections thereon can serve as abutment surfaces.

An embodiment of the driving device according to the invention and several preferred forms of construction of the friction clutch to be used therewith are illustrated by way of example in the accompanying drawings, in which:

FIG. 1 is an axial section through an electrically operated driving device according to the invention with a friction clutch;

FIG. 2 an elevation of a motor vehicle door seen from the inner side with a sliding window and a driving device according to the invention for operating this sliding window;

FIG. 3 an exploded view of the friction clutch and adjacent parts of the mechanism shown in FIG. 1, and FIG. 4 an exploded view of another form of construction of the friction clutch according to the invention.

According to FIG. 1 a driving assembly is provided consisting of an electric motor 1 and a gear 2 connected therewith, which, in view of the possible need for manual operation, becoming necessary, is preferably a spur wheel gear. This assembly is accommodated in a housing 3.

The driving shaft 4 of the motor engages in a clutch sleeve 5 and is positively connected for rotation therewith. At the other end, the clutch sleeve is loosely connected with the window shaft 6 for the driving wheel 7 through the intermediary of one or more sleeves of sheet metal provided with ribs. These sleeves, one of which is shown by way of example and is designated by numeral 13, is resiliently fitted with friction on the window shaft 6 and held with a certain amount of initial tension in the clutch sleeve 5. Such a sleeve made from sheet spring steel and provided with ribs, transmits a predetermined torque to the window shaft 6. When this torque is exceeded, the sleeve 13 rotates in the clutch sleeve 5. Such sleeves provided with ribs and serving as friction clutch, are easy and cheap to manufacture in mass production.

The gear wheel 7 is loosely mounted on the window shaft 6, and can be either made from strong material and milled, but is preferably produced as a cheap sheet metal stamping.

This gear wheel 7 is provided with recesses 15 extending parallel to the periphery of the wheel. The arms of a U-shaped fork 8 engage in these recesses. A spacer 9 is connected to the shaft 6 for common rotataion therewith. A conventional entrainment spring brake 10 is arranged surrounding this spacer. For this purpose the spacer is provided with suitable radial recesses 14. The arms of the fork 8 are located with lateral play in axial recesses 14'. The entrainment spring brake 10 as well as the fork 8, the spacer 9 and the gear wheel 7 are located in a housing 11 against the wall of which the entrainment spring brake 10 bears.

If the electric motor is energized, the drive will be transmitted through the motor driving shaft 4, clutch sleeve 5 and the ribbed sheet metal sleeve 13 to the window shaft 6 and further by the spacer 9 to the arms of the fork 8 and the gear wheel 7, which is in mesh with a screw thread formed on the cable 12. As a result the cable 12 is axially displaced (for example in a tubular guide) and actuates the sliding window 20 through the intermediary of a connecting element 19.

The motor-gear assembly in the housing 3 is so small that it can be accommodated in the space between the inner plate 18 and the outer plate (not shown) of the vehicle door, where other parts of the driving mechanism are also accommodated. The entire mechanism is carried by the inner plate 18.

The window shaft may, as already mentioned, be provided at its end remote from the clutch sleeve 5 with an extension 17 so that a hand crank 16 can be fitted thereon in the event of failure of the electric drive to function. Since the position of the housing 3 on the vehicle door can, thanks to the cable connection, be chosen practically at will, it is, for example, possible to mount the end of the window shaft for receiving the hand crank so that it is accessible from the underside of the door. For this purpose a hole can be provided at the bottom of the door through which the entire driving mechanism can be actuated.

Since according to the invention constructional elements, at least some of which are readily available, are assembled in a new and useful manner, a greatly simplified and cheap construction of the new driving device is possible.

The friction clutch in particular protects the window raising elements and also the electric motor against overloading. The electric motor itself can moreover be protected from overloading by a known thermal switch.

Another form of construction of the clutch is shown in FIG. 4. A shaft driven for example by an electric motor has a journal or pin 22 of smaller external diameter, than the internal diameter of one end of a driven shaft 21 constructed as a cylindrical sleeve 23. A coupling spring 25 wound from strip material has in unstressed state a somewhat larger diameter than the internal diameter of the sleeve 23. The spring 25 is inserted in the sleeve 23 so that the cylindrical outer surface of the spring bears under initial stress against the cylindrical inner wall 24 of the sleeve 23.

The journal 22 is provided with a longitudinal groove 31 into which an element 30 is slipped which has two projections 26 and 27 extending radially beyond the periphery of the journal 22.

When connecting the shaft ends 21 and 22 by inserting the journal 22 in the sleeve 23 against the inner wall of which the spring 25 bears, the projections 26 and 27 are opposite the substantially radial end faces 28 and 29 of the spring 25.

Upon relative rotation of the two shafts and due to the initial tension in the spring, either the projection 27 will come to bear on the spring end 29 or the projection 26 on the spring end 28 and tend to spread the spring further, i.e. to increase the diameter of the spring. As a result the spring is pressed still more strongly against the cylindrical bore 24 of the sleeve and thus increases the friction opposing relative rotation of the spring and the sleeve 23. Until the spring slips and the friction produced is overcome, a particular magnitude of torque is established which is predetermined by the dimensions of the sleeve, the number of windings of the spring, the pretension of the spring, the size of the friction surfaces and of the friction coefficient.

Tests with the friction clutch above described have shown that for example with a spring composed of three windings of 5 x 1 mm. spring steel band with an internal diameter of the sleeve of 12 mm. and an external diameter of the unstressed spring of 12.6 mm., a maximum torque of 55 to 60 cm./kg. can be transmitted and this torque can be kept constant in the case of many thousand operations in alternating directions, without relaxation occurring due to wear of the cooperating parts.

Such a friction clutch according to the invention is not restricted to the details of the embodiment described with reference to FIG. 4. In particular the clutch spring can also bear with pre-tension or initial stress against the outer side of a shaft journal, instead of against the inner wall of the sleeve, in which case radially inwardly directed projections are provided on the complementary shaft end constructed as a sleeve, for engaging the spring ends or other suitable abutment surfaces, the loading of which in the direction of rotation causes an increase in spring tension and friction in this case in the sense of reducing the internal diameter of the spring acting on the outer side of a shaft end.

Instead of a spiral spring other kinds of springs can be used, for example a split ring. The abutments for the engagement of the spring may be rigidly or detachably connected with the respective shaft end in any suitable manner.

A friction clutch according to the invention can be used not only for electric driving devices for sliding windows, but also for many other different drives, for example for sliding roofs of motor vehicles or for hand operated parts for which it is desired or advisable to limit the driving energy to be transmitted.

I claim:

1. In a driving mechanism for a sliding window of a motor vehicle, said mechanism having a drive cable connected to the window, and a driving wheel in driving engagement with said cable to displace the same in opposite directions to raise and lower the window, the improvement comprising a driving unit including a reversible motor and reduction gearing, a first shaft driven by said motor via said gearing in opposite directions, a second shaft, means connecting said driving wheel to said second shaft in driving relation, one of said shafts being hollow, the other of said shafts being inserted in the latter shaft, and friction clutch means constituted of flexible sheet material in the form of a hollow cylindrical body interposed between said shafts and preloaded to bear under initial radial stress against the hollow shaft for frictional engagement therewith and adapted for driving engagement with said other shaft for transmitting torque of limited magnitude in either direction between said shafts, said cylindrical body being constituted of at least one winding of said material and having radial terminal faces at opposite ends of the cylindrical body, said cylindrical body having a normal outer diameter exceeding the inner diameter of the hollow shaft, said body being inserted within and urged outwardly against the inner surface of the hollow shaft in frictional engagement, and means rotatably secured with the said other shaft for engaging respective of said terminal faces, dependent upon the direction of rotation of said first shaft, to drivingly engage the said other shaft and the cylindrical body together for transmitting torque of said limited magnitude between said shafts, said cylindrical body tending to expand in diameter as torque is transmitted between said shafts due to the winding of said body.

2. In a driving mechanism as claimed in claim 1 wherein said means on said one shaft for engaging the cylindrical body comprises an element including in a direction abutments extending radially from said one shaft and facing the radial terminal faces of the cylindrical body, said one shaft having a groove, said element being supported in said groove.

3. In a driving mechanism as claimed in claim 1 wherein said driving wheel is adapted for being loosely mounted on said second shaft, said driving wheel having recesses extending in a direction parallel to the periphery of said wheel, said means connecting said second shaft to said driving wheel comprising a fork of U-shape including arms accommodated in said recesses, a spacer rigidly mounted on said second shaft and having recesses extending parallel to the axis of said second shaft, the latter said recesses receiving with circumferential play said arms, a housing enclosing the spacer and a helical braking spring between said spacer and said housing.

4. In a driving mechanism as claimed in claim 1 wherein said second shaft has a free end remote from the friction clutch means, the mechanism further comprising an extension on said free end of the second shaft adapted for receiving a hand crank.

References Cited by the Examiner

UNITED STATES PATENTS

| 2,718,395 | 9/55 | Ehrlich | 269—124 |
| 2,973,991 | 3/61 | Werner | 268—124 |
| 3,019,871 | 2/62 | Sauzedde | 192—76 X |

FOREIGN PATENTS

| 1,232,890 | 4/60 | France. |

HARRISON R. MOSELEY, *Primary Examiner.*